(12) United States Patent
Hoetzel et al.

(10) Patent No.: US 6,784,808 B2
(45) Date of Patent: Aug. 31, 2004

(54) DISTANCE SENSOR DEVICE

(75) Inventors: Juergen Hoetzel, Florstadt (DE); Marco Knoblauch, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/169,452

(22) PCT Filed: Dec. 22, 2000

(86) PCT No.: PCT/DE00/04618

§ 371 (c)(1),
(2), (4) Date: Nov. 4, 2002

(87) PCT Pub. No.: WO01/50153

PCT Pub. Date: Jul. 12, 2001

(65) Prior Publication Data

US 2003/0128137 A1 Jul. 10, 2003

(30) Foreign Application Priority Data

Dec. 30, 1999 (DE) .......................................... 199 63 755

(51) Int. Cl.⁷ ................................................ G08G 1/14
(52) U.S. Cl. .................... 340/932.2; 340/435; 340/903; 342/118; 367/99
(58) Field of Search .............................. 340/932.2, 435, 340/436, 903; 342/118; 367/99, 118, 197; 180/167, 169

(56) References Cited

U.S. PATENT DOCUMENTS

| | | | | |
|---|---|---|---|---|
| 3,707,717 A | * | 12/1972 | Frielinghaus | 342/23 |
| 3,801,978 A | * | 4/1974 | Gershberg et al. | 340/516 |
| 5,206,652 A | * | 4/1993 | Hoyt et al. | 342/52 |
| 5,530,651 A | | 6/1996 | Uemura et al. | 340/435 |
| 5,587,938 A | | 12/1996 | Heotzel et al. | 340/932.2 |
| 5,602,542 A | * | 2/1997 | Widmann | 340/903 |
| 5,754,123 A | | 5/1998 | Nashif et al. | 340/903 |

FOREIGN PATENT DOCUMENTS

| | | |
|---|---|---|
| DE | 34 20 004 | 12/1985 |
| DE | 34 200 004 | 5/1992 |
| DE | 197 02 688 | 7/1998 |
| DE | 197 21 834 | 11/1998 |
| DE | 199 02 185 | 8/2000 |
| EP | 0 952 460 | 10/1999 |

* cited by examiner

Primary Examiner—Donnie L. Crosland
(74) Attorney, Agent, or Firm—Kenyon & Kenyon

(57) ABSTRACT

A distance sensor device, in particular as a component of a parking aid or reversing aid for a motor vehicle, includes one or more distance sensors and a distance sensor control device for the purpose of activating the distance sensor or sensors via a respective signal line using an activation pulse that is quasi-digital and time-analog. At least one of the distance sensors has two different modes of operation. The modes of operation may be switched by varying the duration and/or amplitude of the activation from the distance sensor control device.

8 Claims, 4 Drawing Sheets

DISTANCE SENSOR DEVICE

This application is a national stage of International Patent Application No. PCT/DE00/04618.

FIELD OF THE INVENTION

The present invention relates to a distance sensor device, and in particular, relates to use of a distance sensor device as a component of a parking aid or reversing aid for a motor vehicle, having one or more distance sensors and a distance sensor control device for activating the one or more distance sensors by way of a respective signal line by means of an activation pulse that is preferably quasi-digital and time-analog.

BACKGROUND INFORMATION

Parking and reversing aids can be used as accessories for motor vehicles. These products may include several (up to ten) ultrasonic sensors, a control device assigned thereto, and one or more acoustic or optoacoustic warning elements for the driver.

FIG. 5 illustrates a conventional ultrasonic distance sensor device for a reversing aid having four ultrasonic sensors US and a control device US-SG. Four signal lines as well as a power supply line and a ground line run from control device US-SG to a distributor V. From distributor V, one signal line as well as the power supply line and ground line run to each ultrasonic sensor US.

The activation of ultrasonic sensors US by way of the respective signal line occurs by way of a respective bidirectional open collector interface. With respect to amplitude, the transmission occurs in a quasi-digital, but time-analog manner.

FIG. 6 shows an activation pulse produced internally in the control device for an ultrasonic sensor US of the device according to FIG. 5. Time t is plotted on the x axis and voltage amplitude U is plotted on the y axis.

The duration of this activation pulse, which activates the measuring procedure in ultrasonic sensor US, is $t_1-t_0$ (typically 300 µs). Thus, at the beginning of time $t_0$, ultrasonic sensor US begins to transmit its ultrasonic pulse.

FIG. 7 shows the signal response produced internally in ultrasonic sensor US for an ultrasonic sensor US of the device according to FIG. 5. Time t is plotted on the x axis and voltage amplitude U is plotted on the y axis.

A comparator, which is not shown, inspects or monitors the signal voltage of the ultrasonic transducer for a sufficiently high received amplitude, and the voltage is only assessed as the detection of an object above a certain minimum amplitude, in order to eliminate sound effects or interference effects.

The time interval between $t_2$ and $t_3$ shows the mechanical vibration of the sensor membrane as a result of the activation. The time between $t_4$ and $t_5$ has the detected ultrasonic energy that has been reflected by an object.

FIG. 8 shows the signals on the data line between control device US-SG and ultrasonic sensor US as a whole for the known ultrasonic distance sensor device according to FIG. 5. Time t is plotted on the x axis and voltage amplitude U is plotted on the y axis.

The time difference between $t_0$ and $t_4$ represents distance s between the reflecting object and ultrasonic sensor US that is calculated in control device US-SG. The following formulas shall apply:

$$S=C_s*t_e/2 \qquad (1)$$

and $$t_e=t_4-t_0 \qquad (2)$$

where $c_s$ is the speed of sound in air.

Unfortunately, the measuring range of the ultrasonic sensors currently available on the market is limited to approximately 2 m.

SUMMARY OF THE INVENTION

The exemplary embodiment of the present invention involves the creating a more flexible distance sensor device.

It is believed that the distance sensor device according to the present invention has the advantage that it is compatible with a conventional ultrasonic sensor in its function and interface and creates the corresponding request-specific function control for an extended functionality by way of the exemplary transmitting/receiving line using the exemplary control device.

It is believed that the similarity in function and interface between the microwave sensor and conventional ultrasonic sensors provides the advantage that an exemplary control device and exemplary software may be used in the same manner with microwave sensors for its current functionality.

It is also believed that the distance sensor device according to the present invention provides additional advantages including the possibility of mixing sensors having various physical properties or sensing principles and the possible structural similarity of the microwave sensor for various applications having different requirements regarding their numbers.

It is also believed that using an exemplary control device, the measuring range and type of measurement for the requirements of different functionalities may be changed.

It is also believed that the measurement values may be filtered using a microcontroller in the exemplary sensor, as well as a self-diagnosis of the exemplary control device and a remote diagnosis of the sensors.

According to the an exemplary embodiment of the present invention, at least one of the exemplary distance sensors has two different modes of operation and may be switched between modes of operation by varying the duration and/or amplitude of the activation pulse of the distance sensor control device.

According to another exemplary embodiment, the distance sensors have several ultrasonic sensors and several microwave sensors. According to one implementation, the ultrasonic sensors have one mode of operation and the microwave sensors have several modes of operation, microwave sensors being particularly suitable for switching between modes. Thus, a microwave sensor may therefore be implemented with a functionally compatible ultrasonic sensor interface and the ability to switch for various requirements. In this manner, the requirements for, e.g., faster measurement cycles, greater ranges, monitoring of a distance section, calculation of the relative speed, data transmission, or strong EMC irradiation (EMC= electromagnetic compatibility) may be switched via the control device. It is believed that an exemplary interface for emulating an ultrasonic sensor may then remain unchanged for the purposes of hardware.

According to another exemplary embodiment, a bidirectional open collector interface is provided between the distance sensor control device and the respective distance sensor.

According to another exemplary embodiment, the various modes of operation may include one or more of measuring range modes, signal transmission modes, test modes, and service modes for the purpose of adjusting or calibrating the sensor.

According to another exemplary embodiment, the modes of operation may include a digital signal transmission mode. It is believed that a switching of an exemplary time-analog, possibly quasi-digital interface into a bidirectional, digital interface with a fixed data format and established protocol may be implemented by using an activation pulse from the control device. It is also believed that it is advantageous in that the exemplary data transmission interface having the exemplary sensor allows lower transmission rates.

According to another exemplary embodiment, the exemplary distance sensor control device is a common control device for all distance sensors that is connected to each distance sensor by way of a single signal line. It is believed that a conventional ultrasonic sensor control device may therefore be used for the functionality that has been extended according to the present invention.

DETAILED DESCRIPTION

Figure 1:
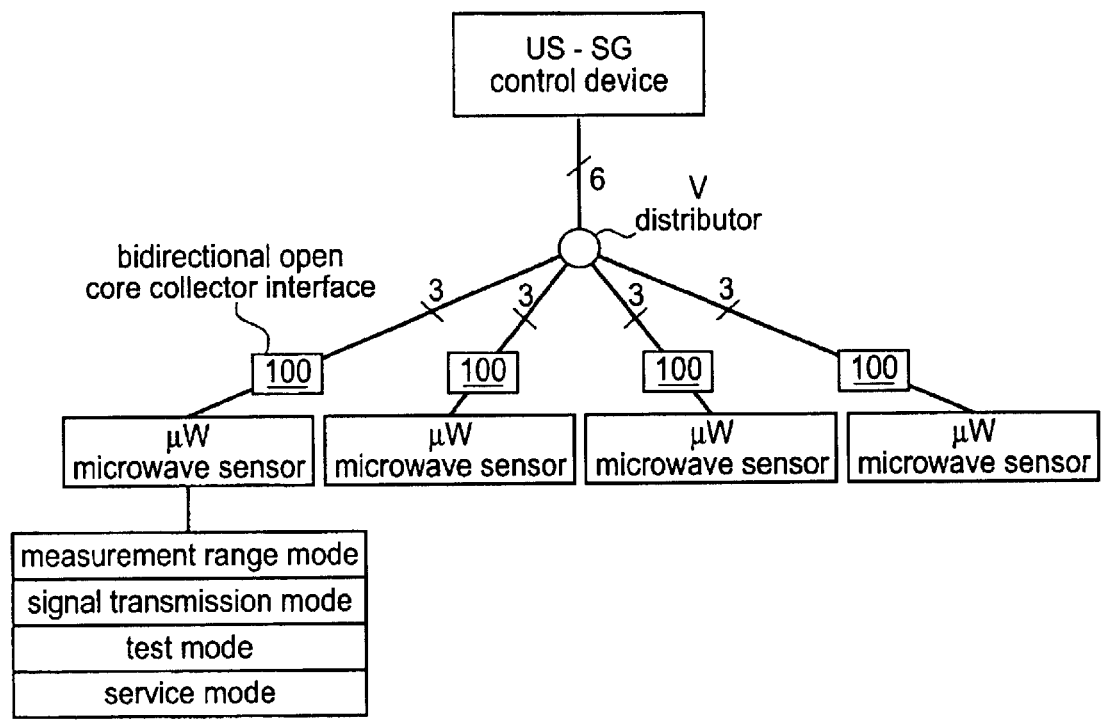
FIG. 1 shows a first embodiment of an exemplary distance sensor device according to the present invention using exemplary microwave sensors having an exemplary ultrasonic sensor device for parking aid and reversing aid applications.

FIG. 1 shows a first embodiment of an exemplary distance sensor device according to the present invention using four microwave sensors $\mu W$ with an ultrasonic sensor control device US-SG for parking aid and reversing aid applications.

From control device US-SG, four signal lines as well as a power supply line and a ground line run to distributor V. From distributor V, a signal line as well as the power supply line and the ground line run to each microwave sensor $\mu W$.

Each microwave sensor $\mu W$ may be activated via the respective signal lines using a bidirectional single-core open collector line. In terms of amplitude, the transmission takes place in a quasi-digital, but time-analog manner.

A sequence control system built into each microwave sensor $\mu W$ or into a microcontroller located in each microwave sensor $\mu W$ monitors the activation pulse of the request emitted by control device US-SG on the sending/receiving line and the signal line. Such a request may also be a request for calibration, display of the parameters that have been set, or, for a reset.

If the activation pulse has the form and duration of the activation pulse of a control device for ultrasonic sensors, it emulates the interface for ultrasonic sensors. According to an exemplary method, the sensor begins the distance measurement and simulates the typical post-pulse oscillation of the ultrasonic sensor on the sending/receiving line. If an object is in the measurement range, time $t_4$ is calculated using the measured distance and the condition $t_0=0=$ beginning of the measurement request according to the above formulas (1) and (2). At time $t_4$, the sending/receiving line may be switched by the sensor to low, i.e., to the detection of an obstacle for a previously determined duration that allows for a secure detection of the confirmation signal by the ultrasonic sensor device. If several obstacles are detected in the detection range at various distances, the distance calculation and obstacle transmission are performed repeatedly according to the procedure described above.

Figure 2:
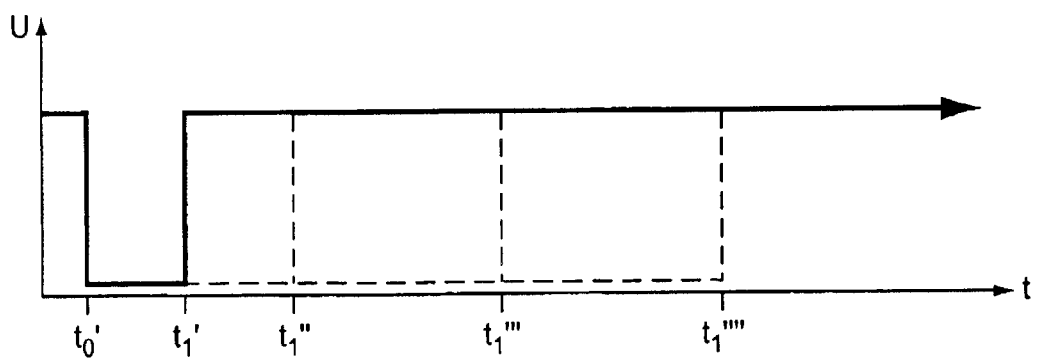
FIG. 2 shows exemplary activation pulses generated internally in a control device for a microwave sensor for the exemplary distance sensor device according to the present invention shown in FIG. 1.

FIG. 2 shows activation pulses generated internally in the control device for a microwave sensor for the distance sensor device according to FIG. 1.

The interface properties are now switched in order to support various functionalities of microwave sensors $\mu W$ by limiting or varying the duration of the activation pulse.

Two basic mechanisms have emerged as being particularly useful in this connection.

The first basic mechanism is a change in the activation duration while maintaining the measured data transmission principle described above.

Here, the switching of microwave sensors $\mu W$ to a measurement range of 0.2 m to 7 m with a measurement duration of 10 ms per measurement range cycle by means of an activation duration of 200 µs corresponding to $(t_1'''-t_0')$ in FIG. 2 or the switching to a measurement range of 0.2 m to 1.5 m with a measurement range cycle time of 2 ms at an activation duration of 100 µs corresponding to $(t_1''-t_0')$ in FIG. 2 shall be used as an example. In addition, $(t_1''''-t_0')$ in FIG. 2 describes a measurement cycle for ultrasonic simulation corresponding to 300 µs in the range of 0.2 to 2 m.

The second basic mechanism is switching the time-analog, quasi-digital interface into a bidirectional, digital interface having a fixed data format and established protocol by means of an activation pulse from control device US-SG. This activation pulse may be shorter than the activation pulses used for the functional switching with the time-analog measurement data transmission technique. A duration of 52 µs corresponding to $(t_1'-t_0')$ in FIG. 2 has been found advantageous, which corresponds to a data transfer rate of 19200 BAUD.

In the established data format and protocol, a request is triggered by control device US-SG using a command word or a command word and data words, whereupon microwave sensor µW responds with an acknowledgment or an acknowledgment with data words. As an exception, however, no acknowledgment is provided at reset.

After each cycle, (e.g., command word from the control device, acknowledgment with data words from the sensor, etc.) control device US-SG may switch microwave sensor µW to a different functionality by altering the activation duration.

The command words or the command words with data words from the control device may, for example, have the following contents:

sensor mode selection;
measurement request;
measurement type setting (distance using pulse, echo, operation, or speed by evaluating the Doppler signal);
setting of the measurement range;
diagnosis request;
time adjustment for triangulation and permanent reception;
pure permanent reception;
transmission of a pulse string;
calibration; and
reset.

The acknowledgment or the acknowledgment with data words from microwave sensor µW may have the following content, for example:

sensor identifier, number of data words, and distance to the nearest obstacles;
sensor identifier, number of data words, distance to and speed of the nearest obstacles;
sensor identifier and results of sensor diagnosis;
sensor identifier and switching to receive mode; and
sensor identifier and data word of a pulse string.

Figure 3:
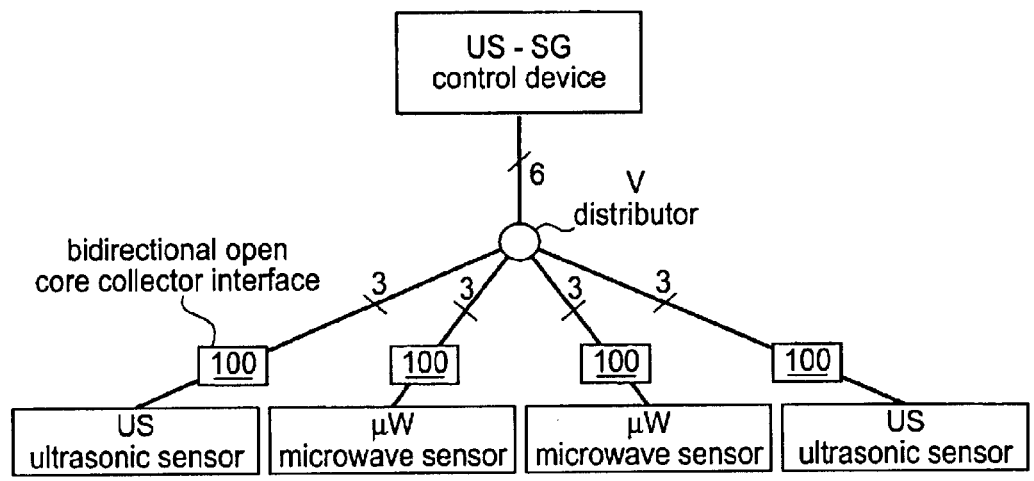
FIG. 3 shows a second embodiment of an exemplary distance sensor device according to the present invention using exemplary microwave and ultrasonic sensors with an ultrasonic sensor device for parking aid and reversing aid applications in a mixed sensor setup.

FIG. 3 shows a second embodiment of the exemplary distance sensor device according to the present invention using microwave and ultrasonic sensors with an ultrasonic sensor device for parking aid and reversing aid applications in a mixed sensor arrangement.

Here, different activation pulse lengths are interpreted differently by the different sensors.

Figure 4:
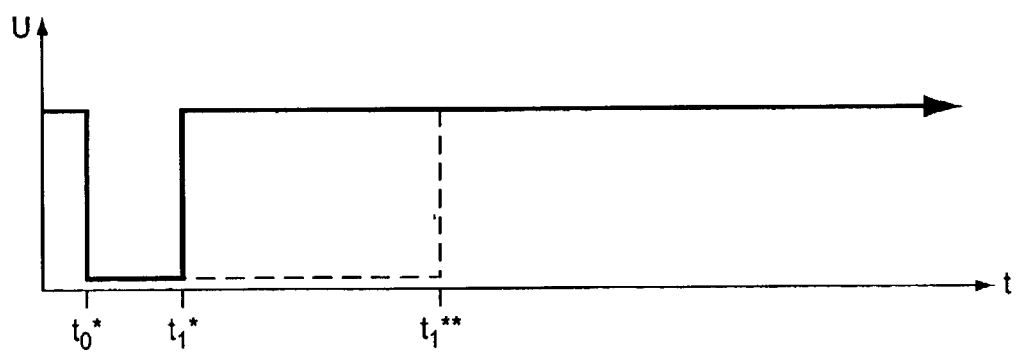
FIG. 4 shows exemplary activation pulses generated internally in the control device for a microwave sensor for the exemplary distance sensor device according shown in FIG. 3.
Figure 5:
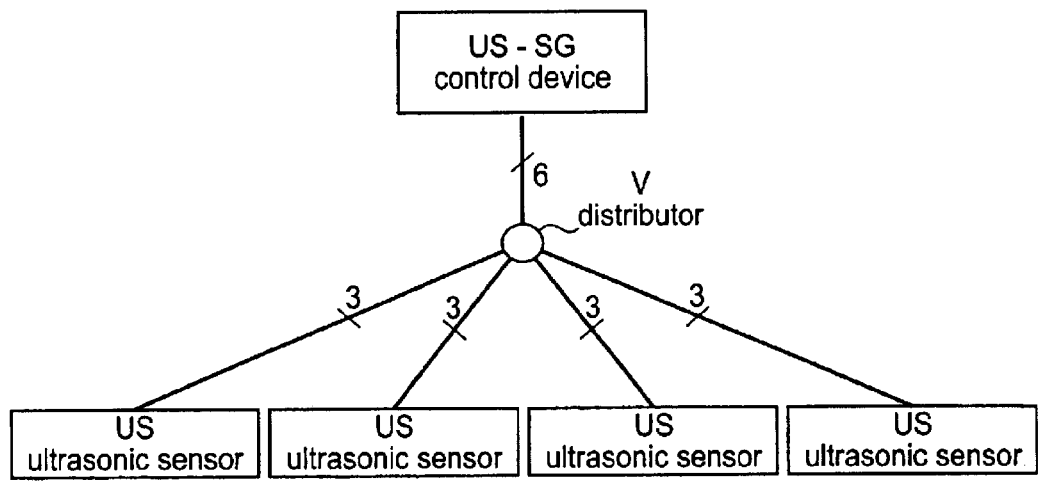
FIG. 5 shows a conventional ultrasonic distance sensor device for a reversing aid having four ultrasonic sensors and one control device.
Figure 6:
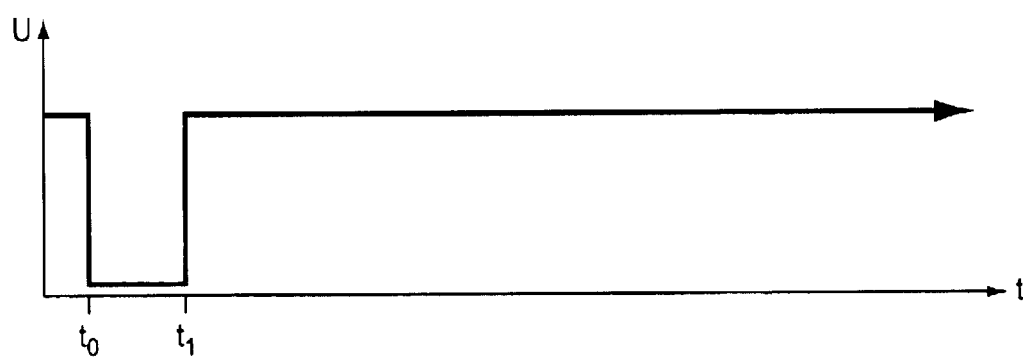
FIG. 6 shows an activation pulse generated internally in the control device for an ultrasonic sensor for the conventional ultrasonic distance sensor device shown in FIG. 5.
Figure 7:
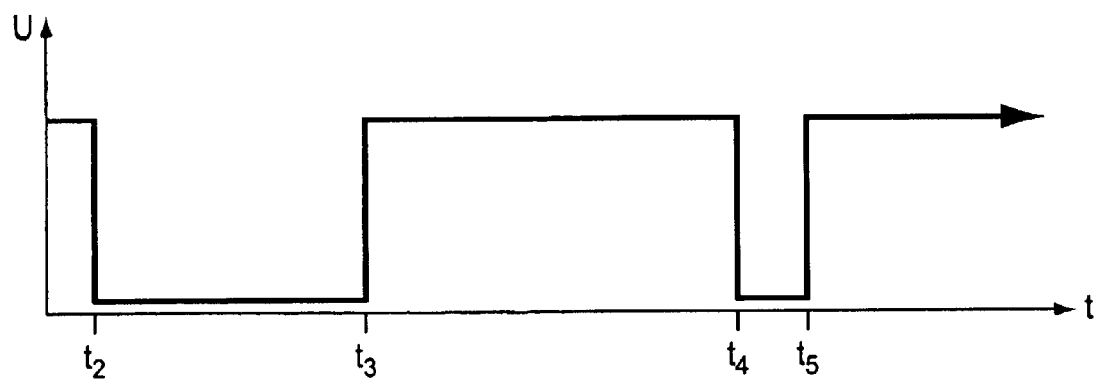
FIG. 7 shows the signal response generated internally in ultrasonic sensor US for an ultrasonic sensor US of the conventional ultrasonic distance sensor device shown in FIG. 5.
Figure 8:
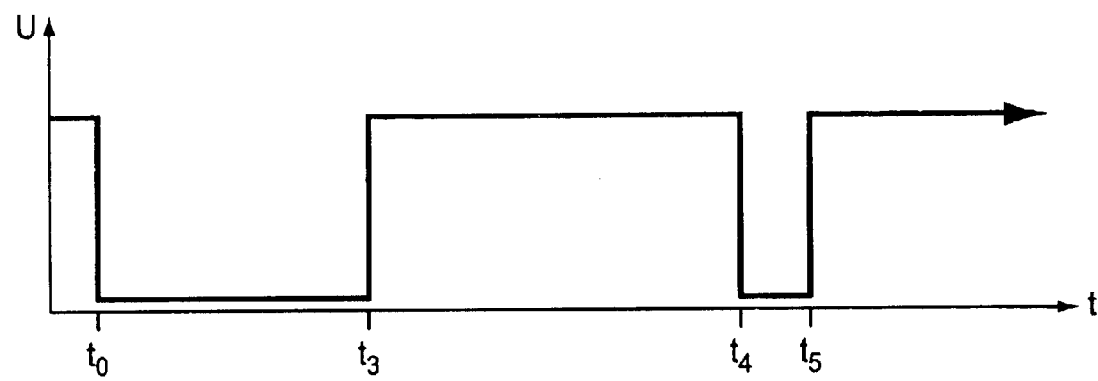
FIG. 8 shows the signals on the data line between the control device and the ultrasonic sensor as a whole for the conventional ultrasonic distance sensor device shown in FIG. 5.
Figure 9:
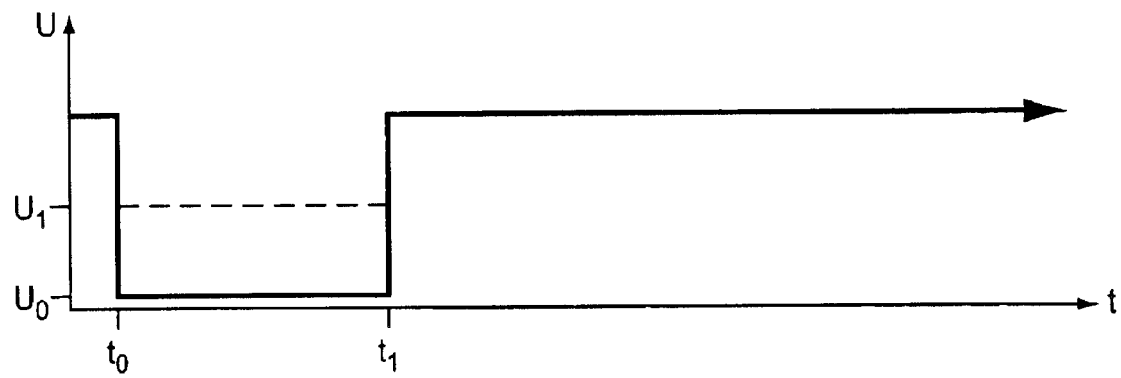
FIG. 9 corresponds to FIG. 4, with the amplitude of the pulse varying instead of the duration of the pulse.

FIG. 4 shows as an example activation pulses generated internally in a control device for a microwave sensor for the distance sensor device according to FIG. 3.

The duration of an activation pulse that triggers the measurement sequence in ultrasonic sensor US in a measurement range of 0.2 m to 2 m is $t_1^{**}-t_0^*$.

The duration of an activation pulse that triggers the measurement sequence in microwave sensor µW in a measurement range of 0.2 m to 1.5 m is $(t_1^*-t_0^*)$.

Although the present invention has been described above with reference to the exemplary embodiments, it is not limited to such embodiments, since it may be modified in a multitude of ways.

If the sensor is always operated by the control device with its interface in the bidirectional digital mode, several sensors may be connected to one sending/receiving line. In this case, an explicit sensor identifier is included in the acknowledgment. In the case of a sensor <->control device point-to-point connection, a sensor identifier may be omitted.

A mixture of different modes for the microwave sensors (individually and according to requirements from the control device) may be used.

The present invention is also not limited to ultrasonic and microwave sensors, but rather may be applied to any sensors.

What is claimed is:

1. A distance sensor device, comprising:
at least one distance sensor, at least one of the at least one distance sensor having at least two different modes of operation; and
a distance sensor control device for activating each of the at least one distance sensor via a respective signal line using an activation pulse, wherein the distance sensor control device is operable to control a switchover between the at least two different modes of operation by varying at least one of a duration and an amplitude of the activation pulse.

2. The distance sensor device of claim 1, wherein the distance sensor device is included in at least one of a parking aid arrangement and a reversing aid arrangement for a motor vehicle.

3. The distance sensor device of claim 1, wherein the at least one distance sensor includes a plurality of ultrasonic sensors and a plurality of microwave sensors.

4. The distance sensor device of claim 3, wherein the plurality of ultrasonic sensors have one mode of operation and the plurality of microwave sensors have more than one mode of operation.

5. The distance sensor device of claim 1, further comprising:
a bidirectional open collector interface arranged between the distance sensor control device and each of the at least one distance sensor.

6. The distance sensor device of claim 1, wherein the at least two different modes of operation include at least one of a measurement range mode, a signal transmission mode, a test mode, and a service mode for calibrating a respective one of the at least one distance sensor.

7. The distance sensor device of claim 6, wherein the at least two different modes of operation include a digital signal transmission mode.

8. The distance sensor device of claim 1, wherein the distance sensor control device is operable as a common control device for all of the at least one distance sensor, and is connected to each of the at least one distance sensor via a single respective signal line.

* * * * *